United States Patent [19]
Smith et al.

[11] Patent Number: 5,494,720
[45] Date of Patent: Feb. 27, 1996

[54] SEAMS AND CLOSURES FOR PLASTIC FABRICS AND CLOTHING

[75] Inventors: W. Novis Smith; Peter Holemans, both of Philadelphia, Pa.

[73] Assignee: Lakeland Industries, Inc., Ronkonkoma, N.Y.

[21] Appl. No.: 297,303

[22] Filed: Aug. 29, 1994

[51] Int. Cl.$^6$ .................................................. B32B 3/06
[52] U.S. Cl. ................................................ 428/57; 2/275
[58] Field of Search ........................... 428/57, 58, 61; 2/275; 112/440, 441

*Primary Examiner*—Alexander S. Thomas
*Attorney, Agent, or Firm*—John Lezdey

[57] ABSTRACT

A heat sealable, adhesive-free seam and closure fabrics and clothing comprising the combination of a fabric scrim and a heat sealable water and vapor resistant coextruded laminations which provides a barrier against liquid substances and vapors. The coextrusion laminations are in abutment or overlap and comprise a film layer with an outer and inner layer of low density polyethylene and an intermediate layer of a copolymer of ethylene and vinyl alcohol. The laminations are fusion bonded to a portion of the scrim in a manner whereby the polyethylene flows from said lamination, encapsulates the ends of the intermediate layer of the laminate and forms weld points with the said scrim to prevent penetration by liquid substances and vapors.

8 Claims, 2 Drawing Sheets

SEAMS AND CLOSURES FOR PLASTIC FABRICS AND CLOTHING

FIELD OF THE INVENTION

The invention relates to heat sealable, adhesive-free high strength seams and closures for plastic fabrics. More particularly, the invention is concerned with heat sealable, adhesive-free seams and closures in combination with fabrics comprising laminates of an inner and outer film layer of a low density polyolefin or ethylene vinyl acetate and an intermediate film layer comprising cellulose acetate, ionomer the copolymer of ethylene and vinyl alcohol, or nylon and clothing or articles made therewith.

BACKGROUND OF THE INVENTION

Protective clothing and containers of many types is well known for many and varied uses including protection from fire, vapors and harmful substances. Such clothing is often seen in suits for industrial workers, firemen, hazardous waste workers, race car drivers, airplane pilots and military personnel. Garments include not only complete hermetic suits, but also individual components such as trousers, jackets, gloves, boots, hats, head coverings, masks, etc.

Regulations restricting exposure to hazardous environments of various kinds, such as those contained in the Occupational Safety and Health Act, make it increasingly necessary to have better and more effective kinds of protective clothing. In particular, certain requirements by the U.S. Coast Guard and related requirements by other U.S. government agencies involve a total protective hermetic suit or envelope around the individual person to protect the worker from the widest possible range of hazardous materials.

Encapsulating suits are necessary for "immediately dangerous to life and health" (IDLH) environments. These suits must be air tight and worn with a self-contained breathing apparatus. The suit must be nonabsorbent, totally impermeable, and resistant to the widest range of chemicals and reagents. It should also be as fire resistant as possible. Since these suits are being worn by active individuals, they should also be flexible, abrasion resistant, lightweight, and should maintain their impermeability while being used. Such suits are commonly called "HAZ MAT" suits with class A level being the most vapor proof.

The garments presently available are almost invariably of thick construction and heavy in weight, and are often fabricated at least in part from materials impermeable to water or water vapor, such as natural and synthetic rubbers and elastomers, chlorinated rubbers, etc.

Protective clothing comprised of laminates of films have the problem of forming kinks when bent. This restricts motion and makes movement cumbersome. Moreover, much of the protective clothing is porous and provides little protection against hazardous chemical vapors.

It is therefore desirable to utilize an impermeable fabric which possesses heat sealing properties and is resistant to a large range of chemicals. Sewn seams are permeable to chemical vapors, whereas heat fused seams are impermeable. Even seams put together with adhesive (hot melt or pressure sensitive) can pull apart or be undercut by vapors.

The optimum sealing of seams, which join the various pieces of laminated fabric to form a protective suit against chemical vapors have a seam that is equal to or better than the laminate fabric against permeable chemical vapors. Therefore, it is preferred to have a laminated fabric which heat seals to itself so that a tape related to the barrier films can be used to heat seal the seam and give excellent chemical protection.

U.S. Pat. No. 4,515,761 to Plotzker describes a protective garment for use in detoxification which contains a layer of a highly fluorinated ion exchange polymer having sulfonic acid multivalent metal ion salt functional groups.

SUMMARY OF THE INVENTION

In accordance with the present invention, a novel seam sealing, vapor and liquid resistant laminate, and a method for sealing without the use of adhesives, is employed for clothing, including raincoats and protective clothing, boots, containers, etc. The seam sealing laminates comprise a first and second laminate of an outer and inner film layer each of which consists of a low density polyethylene and an intermediate layer of an ionomer, nylon, cellulose acetate or a copolymer of ethylene and vinyl alcohol. Preferably, the polyethylene has a softening point of about 250°–350° F. The laminates are both water and chemical resistant. The polyethylene layers weld together to form a lap or butt seam and the intermediate layers provide the protection against breakthrough. Bonding a scrim layer with welds from the polyethylene provides the strength for the seam.

Accordingly, the invention provides a heat sealable water and chemical resistant seam sealing laminate or coextrusion for use in forming protective clothing such as rainwear, chemically protective garments, and the like. The said laminates or coextrusions comprise a film layer with an outer and inner layer of low density polyethylene which creates the bond and an intermediate layer which provides the chemical resistance. The seam is formed by the laminates overlapping or being in abutment. The polyethylene forms a fusion bond between the laminates and the scrim. That is, the polyethylene flows and encapsulates the overlapping or abutting portions as well as forms weld points with the scrim. The seam may be capped with polyethylene which is adhesively a fusion bonded to the seam.

As a support for the laminates, a fabric is fusion bonded by the flowable molten low density polyethylene. The fabric is preferably comprised of high tensile fiber selected from the group consisting of polyethylene terephthalate, polyolefin poly p-phenylene terephthalamide, poly m-phenylene terephthalamide, carbonaceous oxidized polyacrylonitrile, nylon, rayon, cotton and polybenzimidazole or blends thereof to provide strength to the seam.

In accordance with another embodiment of the invention, a method is provided for forming and seam sealing a plastic facepiece such as fluorinated ethylene polyethylene copolymer (FEP) or perfluoralkoxy resin (PFA) onto a plastic garment. The method comprises the steps of A. applying a gasketing compound along the edges of a plastic film suitable for use as a facepiece;

B. placing the facepiece against a laminated fabric which comprises the same material as the seam sealing laminate of the invention;

C. sewing through the laminate and the facepiece to strongly attach the components together;

D. heat sealing film over the holes of the top and bottom of the seam with an appropriate tape to form the headpiece of the garment; and E. (optional) capping over the seam portion with a chemical resistant strip which bonds to the polyethylene either alone or with an adhesive.

The capping over may be performed by adhesively bonding a suitable chemical resistant strip, such as FEP tape or the laminate used in the invention.

This approach can be used for seam sealing any dissimilar material to the suit such as facepieces or zippers.

In order to maximize the impermeability of the fabric seam against all liquid substances and vapors, laminates forming the seam must be composed of a coextrusion or laminate which includes an ionomer, cellulose acetate, nylon or the copolymer of ethylene and vinyl alcohol sandwiched between two chemical resistant layers of low density polyethylene. Additionally, the film itself must be without pin holes, outer fibers or porosity which lessen the barrier resistance of the actual film. Fusion bonding a continuously formed laminate to a fabric gains the strength of the woven or non-woven fabric without interfering with barrier properties of the film. It enhances the resistance to flex cracking, wrinkles and failure from tearing and bursting to the total laminated fabric. Because of the absolute fail-safe requirements of chemical protective clothing and the need for easily putting the suit on or taking it off, an inner layer of film should also be used to form a sandwich with the fabric. This maximizes the flexibility of a given construction with the total plastic film barrier being split into two layers and being easier to flex than one thick layer.

Furthermore, it is essential that the seams throughout the garment as well as along a facepiece be resistant to failure, so that they are melt fusion bonded, preferably with additional tape similar to the actual fabric film. It is critical in the invention that a low density polyethylene be utilized since medium and high density polyethylene do not possess the heat sealing features necessary for the invention.

The sealing with the low density polyethylene can occur at lower temperatures than most plastics using heat and pressure or by ultrasonic bonding.

The laminate of the invention can be used to produce chemical and weather protective clothing as well as containers. Embossing the laminates of the invention improves their flexibility as well as the strength of the laminate.

In accordance with another embodiment, the invention provides a self heat sealing fabric seam for clothing, containers and covers for protection against liquids and vapors. More particularly, the fabric seam is provided with an outer layer comprising a coextrusion or laminate of a copolymer of ethylene and vinyl alcohol (EVOH) sandwiched between a polyolefin or ethylene vinyl acetate layer, an intermediate layer of a fabric, preferably of high tensile fibers and a film layer bonded on the inner surface of the fabric comprising either the seam sealing laminate or a polyolefin film. The ethylene-vinyl alcohol copolymer inner layer can comprise the copolymer itself or it can comprise a layer of the ethylene-vinyl alcohol copolymer extruded with one or more layers of a polyolefin, for example, polyethylene, polypropylene and the like or an ionomer, for example ethylene-vinyl alcohol copolymer, and the like. Another version of this fabric seam uses only one layer of film bonded to the scrim.

The invention also relates to impermeable seams and closures in garments, rainwear, containers and covers which are fabricated in part from the fabric of the invention.

Other objects and a fuller understanding of the invention will be had by referring to the following description and claims taken in conjunction with the accompanying drawing.

DESCRIPTION OF THE PREFERRED EMBODIMENTS

Figure 1:
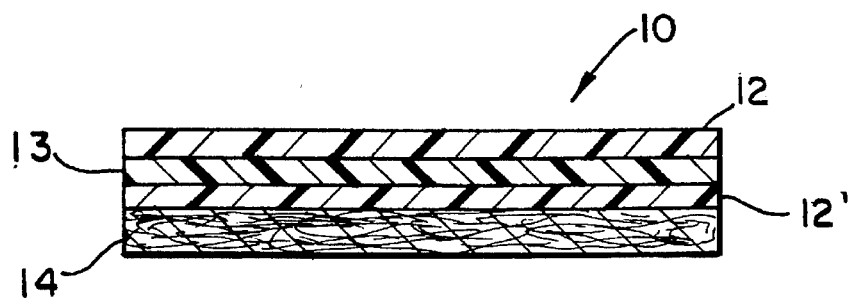
FIG. 1 is a exploded sectional view of the coextrusion or laminate film of the invention.

Although specific terms are used in the following description for the sake of clarity, these terms are intended to refer only to the particular structure of the invention selected for illustration in the drawings, and are not intended to define or limit the scope of the invention.

As shown in FIG. 1, there is provided a laminate 10 comprising an outer film layer 11 and an inner film layer 13 consisting of a low density polyethylene coextruded with an intermediate film layer 12 containing the ethylene-vinyl alcohol copolymer layer. The laminate is suitable in the form of strips to act as seam sealers by thermally bonding to a garment or in forming a zipper strip. Other film layers may be included along with the EVOH but it is critical that the outer layers be a low melting version of polyethylene or its copolymers.

Figure 2:
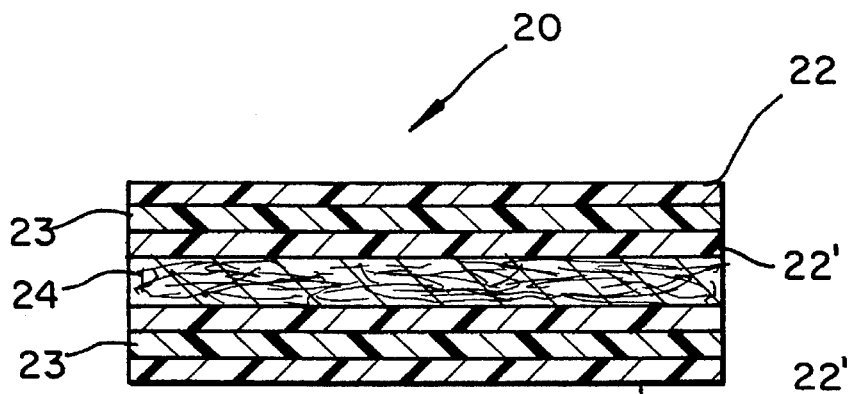
FIG. 2 is a sectional view illustrating the laminate of the invention.
Figure 3:
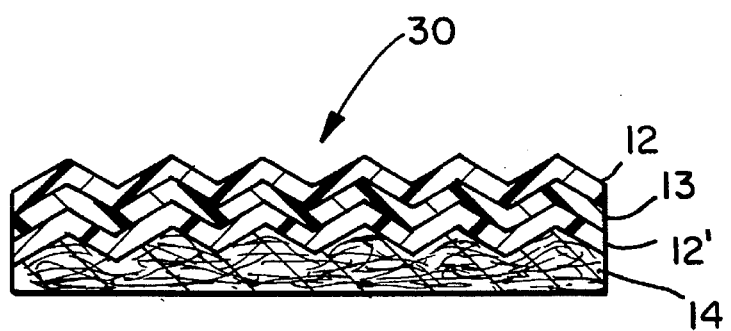
FIG. 3 is a sectional view illustrating an alternative laminate of the invention.

FIG. 2 shows a laminate 15 which is formed with the laminate 10 of FIG. 1. Laminate 15 comprises a top layer 11 of low density polyethylene bonded to the copolymer 12 of ethylene and vinyl alcohol which in turn is bonded to a further layer 13 of low density polyethylene. The laminate 10 is advantageously fusion bonded to a scrim of a non-woven, woven or knitted fabric 16 which preferably comprises a high tensile strength material. Fusion bonding by heat and pressure or ultrasonic bonding with added molten low density polyethylene or EVA causes the polyethylene layer 13 to flow and encapsulate portions of the fabric 16 with weld points 13a so as to provide additional strength to the overall structure. Further heat or ultrasonic bonding with added molten low density polyethylene or EVA form an additional layer 17 with the developed weld point 17a. Weld point 17 may be the same film as laminate 15 or a low density polyethylene layer. The laminate 10 may constitute just the laminate 15 bonded to the fabric as in FIG. 3. The formed laminate 15 can comprise the entire protective garment or function as a seam sealer.

Alternatively, the laminate 10 can be bonded to the fabric 16 to form a laminated fabric. However, to maximize the impermeability of the fabric against toxic vapors and to provide heat sealability to both sides of the laminated fabric, a further layer 17 is bonded to laminate 10 or a further low density polyethylene film layer is bonded to the fabric 16. An adhesive bond provides greater flexibility than fusion bonding for this layer. However, there should be no seams in the outer shell which is adhesively bonded. Advantageously, the adhesive utilized for bonding to the outer fabric is fire resistant.

Figure 4:
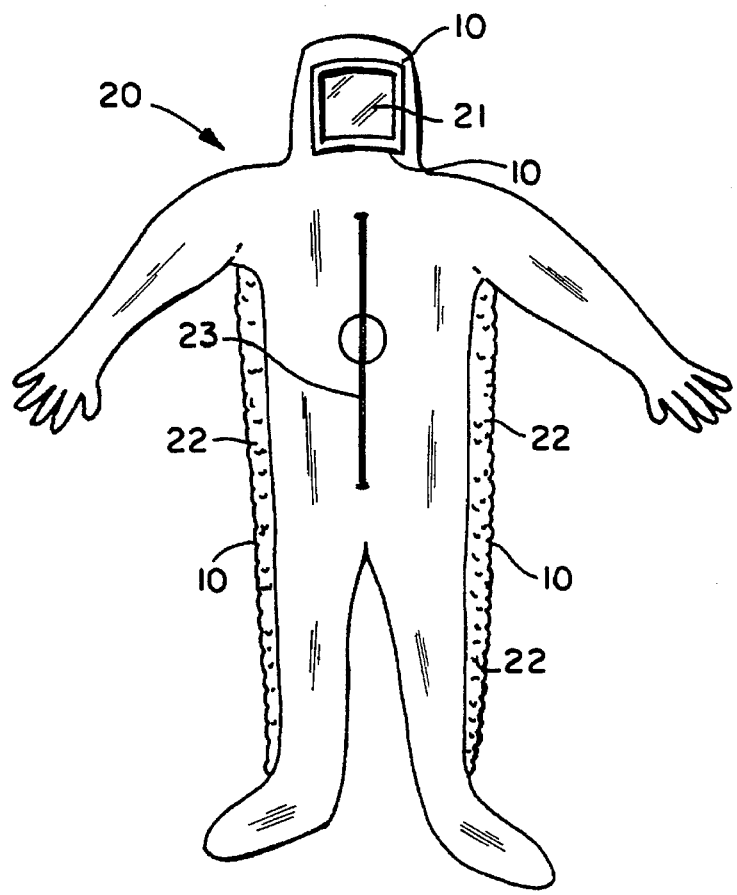
FIG. 4 illustrates a protective garment with the seal and fabric of the invention.

As illustrated in FIG. 4, a protective garment 20 is prepared from the fabric comprising films with the outer layers of low density polyethylene. The garment 20 is provided with an optically transparent facepiece 21 and zipper strip 23. The facepiece 21 and zipper strip 23 can be formed from thick films of polyvinyl chloride or a ethylenevinyl alcohol copolymer layer similar to the film used in the interior of the garment 20. The facepiece 21 can also comprise a barrier film such as a Teflon (PFA, FEP), nylon, polyester, or an ionomer which is optically transparent and inert to many chemicals. Preferably, perfluoroalkoxy resin (PFA) or fluorinated ethylene polyethylene copolymer (FEP) is used. Suitable ionomers are described in U.S. Pat. No. 4,799,346, which is herein incorporated by reference.

The garment 20 is sealed with strips of the laminate 10 or low density polyethylene along the seams, facepiece 21 and zipper strip 23. Embossments 22 of the strip 10 provides flexibility and strength to the seams.

The entire laminated fabric can also be embossed to minimize wrinkling of the suit as well as provide enhanced flexibility and strength.

Figure 5:
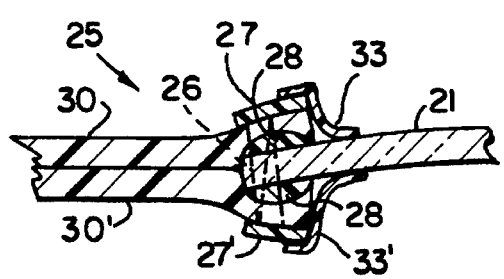
FIG. 5 is a sectional view of the seam of the invention of the invention.

FIG. 5 illustrates a method of seam sealing of zippers with dissimilar materials such as polyvinyl chloride or butyl rubber or neoprene. The fabric layers 30,30' which consist of the same structure as the laminate 10 of the FIG. 1 are cut out and sandwich an intermediate fabric 21 along its edges. A gasketing compound 28, preferably a siloxane adhesive such as polydimethyl siloxane, is provided. A thread 26, preferably a high tensile fiber, is sewn through the layers 30,30' and fabric 21. The layers 30,30' are heat sealed together along the edges of the fabric 21. The threaded area is then capped so as to prevent any vapors from penetrating through pinholes that may exist and to further strengthen the area. This maybe done from one or both sides. A suitable method of capping utilizes a strip of a chemical resistant material such as the laminate 10 of FIG. 1. Alternatively, the strips can be heat sealed over the area. Heat sealable strips 33, 33' that are compatible with the material used for the facepiece seal the edges along the fabric 21.

Figure 6:
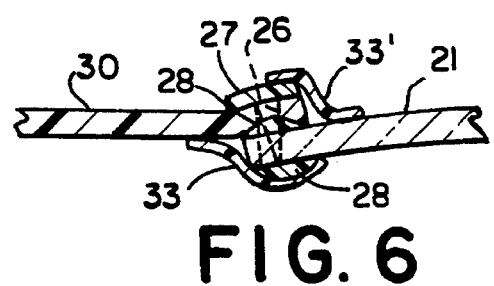
FIG. 6 is a sectional view of an alternative way for the seam of the invention.

Alternatively in FIG. 6, the heat sealable laminated fabric seam is placed only on one side of the dissimilar materials layer. The gasketing compound 28 is placed between the sewn seam. The outer seam holes are capped with a heat sealable film 27. The inside holes are heat sealed with a compatible tape, such as, FEP or PFA sealing tape for an FEP or PFA window. In those cases where a heat sealable tape is not available, then a hot melt tape is sealed over the seams. Optionally, an FEP pressure sensitive tape 33,33' can be applied over the back seam holes and along the edges where the two layers overlap 33,33'.

The thickness of the polyethylene films is generally in the range of about 0.8 to 10 mils. The total thickness of the laminate 10 is generally about 10–30 mils. The ethylenevinyl alcohol copolymer preferably contains about 20 to 70% vinyl alcohol, although, it can also contain ionomer residues.

The ethylene vinyl alcohol copolymer layers in the coextrusion films or laminates range in thickness from about 0.1 to 2.0 mils and can comprise one or more layers. The overall thickness of these co-extruded films is preferably about 2 to 10 mils depending upon the ultimate use. Generally, the other resin layers are polyethylene, nylon or SURLYN (ionomer) in addition to the ethylene-vinyl alcohol copolymer layer.

The intermediate fabrics 16 which are used in making the laminated fabric 18 are many and varied. They can be, but are not limited to cotton, KEVLAR, NOMEX, PBI, rayon, wool, silk, polyester, nylon, polyethylene, polypropylene or other high tensile strength fibers.

The high tensile strength fibers which may be utilized to prepare the fabric layer 16 of the present invention include polyamides such as poly (m-phenylene isophthalamide), poly (p-phenylene terephthalamide) KEVLAR, poly (m-phenylene terephthalamide), NOMEX, nylon, polyolefins, polyethylene terephthalate (PET), carbonaceous polymeric materials such as those described in U.S. Pat. No. 4,837,076, polybenzimidazole, oxidized polyacrylonitrile fibers and blends thereof.

The intermediate fabric 16 includes plain and upstop weaves and knitted, non-woven, felted, spun bonded, melt spun or porous fabric. Preferably, the fabric is fire resistant. The intermediate fabric 16 must provide high flexibility, tear strength and resistance to cracking and wrinkling. It must prevent damage to the inner film layer in the event the outer film is punctured so as to prevent exposure by the wearer to toxic chemicals.

The fabric 16 can be bonded to the outer films by an adhesive, preferably a flexible adhesive. Preferable adhesive compositions include ethylenevinyl acetate, low melting polyolefins, urethanes, polyesters, and ethyleneacrylic ester copolymers such as described in U.S. Pat. No. 4,322,516, which is incorporated herein by reference. Pressure sensitive, thermoset and hot melt adhesives may be used. It is also desirable that this adhesive be fire resistant in appropriate cases. It is critical that all outer seams are formed by fusion bonding.

Although the invention has been described with preferred embodiments, it is understood that variations and modifications may be employed without departing from the concept of the invention as defined in the following claims.

What is claimed is:

1. A heat sealable seam for plastic fabrics and clothing comprising the combination of a fabric scrim and a heat sealable water and vapor resistant coextruded lamination which provides a barrier against liquid substances and vapors, said lamination being in an abutting or overlapping relationship and comprising outer and inner film layers of low density polyethylene and an intermediate film layer of a copolymer of ethylene and vinyl alcohol, said film layers being fusion bonded to each other to form said lamination, which is fusion bonded to said scrim, where in the polyethylene flows from said lamination, encapsulates portions of said intermediate layer and forms weld points with said scrim to prevent penetration by liquids and vapors.

2. The seam of claim 1 wherein a further layer of a low density polyethylene layer is adhesively bonded to said scrim.

3. The seam of claim 1 which is a butt seam.

4. The seam of claim 1 wherein low density polyethylene is fusion bonded over the edge of said lamination and said scrim.

5. The seam of claim 1 wherein said low density polyethylene has a softening point of about 250°–350° F.

6. The seam of claim 1 wherein said scrim comprises high tensile fibers selected from the group consisting of polyethylene terephthalate, polyolefins, poly p-phenylene terephthalamide, poly m-phenylene terephthalamide, carbonaceous polymeric oxidized polyacrylonitrile, nylon, polybenzimidazole and mixtures thereof.

7. A garment fabricated in part with the seam of claim 1.

8. The seam of claim 1, wherein said seam is free of adhesives.

* * * * *